United States Patent
Baba et al.

(10) Patent No.: US 10,230,946 B2
(45) Date of Patent: Mar. 12, 2019

(54) METHOD OF DETECTING TILT OF IMAGE CAPTURING DIRECTION AND APPARATUS OF DETECTING TILT OF IMAGE CAPTURING DIRECTION

(71) Applicant: FUJITSU LIMITED, Kawasaki-shi, Kanagawa (JP)

(72) Inventors: Kozo Baba, Oita (JP); Norio Hashiguchi, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/666,552

(22) Filed: Mar. 24, 2015

(65) Prior Publication Data
US 2015/0304651 A1  Oct. 22, 2015

(30) Foreign Application Priority Data
Apr. 18, 2014 (JP) .................................. 2014-086526

(51) Int. Cl.
G06T 15/80 (2011.01)
H04N 17/00 (2006.01)
G06T 7/80 (2017.01)
G06T 7/73 (2017.01)

(52) U.S. Cl.
CPC ............. *H04N 17/002* (2013.01); *G06T 7/73* (2017.01); *G06T 7/80* (2017.01); *G06T 2207/30252* (2013.01)

(58) Field of Classification Search
CPC .................................................. H04N 17/002
USPC ........................................................ 348/187
See application file for complete search history.

(56) References Cited

U.S. PATENT DOCUMENTS

| | | | |
|---|---|---|---|
| 6,963,661 B1 * | 11/2005 | Hattori | B60R 1/00 348/169 |
| 6,993,159 B1 | 1/2006 | Ishii et al. | |
| 8,594,370 B2 * | 11/2013 | Schamp | B60R 21/0134 340/425.5 |
| 8,687,070 B2 * | 4/2014 | Chen | H04N 5/23248 348/208.3 |
| 2003/0202694 A1 | 10/2003 | Shima | |

(Continued)

FOREIGN PATENT DOCUMENTS

| | | |
|---|---|---|
| JP | 08-285534 | 11/1996 |
| JP | 2004-239613 | 8/2004 |

(Continued)

OTHER PUBLICATIONS

U.S. Non-Final Office Action dated Apr. 26, 2017 for copending U.S. Appl. No. 14/672,565, 25 pages.
Restriction Requirement dated Apr. 4, 2017 for copending U.S. Appl. No. 14/662,777, 6 pages.
Japanese Office Action dated Nov. 21, 2017 for corresponding Japanese Application No. 2014-086526, with English Translation, 5 pages.

(Continued)

*Primary Examiner* — Jefferey F Harold
*Assistant Examiner* — Sihar A Karwan
(74) *Attorney, Agent, or Firm* — Fujitsu Patent Center (57) ABSTRACT

An image processing device includes an acquisition unit, an extraction unit, and a detection unit. The acquisition unit acquires image data for each of frame numbers from a drive recorder or the like. The extraction unit extracts a plurality of straight lines from the image data on the basis of drive recorder information. The detection unit detects a tilt of an image capturing direction of a camera according to a magnitude of an angle between a vertical axis direction of the image data and the extracted plurality of lines.

3 Claims, 7 Drawing Sheets

(56) References Cited

U.S. PATENT DOCUMENTS

| | | | |
|---|---|---|---|
| 2004/0172173 A1 | 9/2004 | Goto et al. |
| 2004/0201483 A1 | 10/2004 | Stam et al. |
| 2009/0290809 A1 | 11/2009 | Yamada |
| 2010/0054542 A1 | 3/2010 | Archibald et al. |
| 2010/0080467 A1 | 4/2010 | Sakurai |
| 2011/0311156 A1 | 12/2011 | Seo et al. |
| 2013/0321630 A1 | 12/2013 | Shin |
| 2015/0154460 A1 | 6/2015 | Baba et al. |
| 2015/0169970 A1 | 6/2015 | Baba et al. |
| 2015/0302588 A1 | 10/2015 | Baba et al. |
| 2015/0304650 A1 | 10/2015 | Baba et al. |

FOREIGN PATENT DOCUMENTS

| | | | |
|---|---|---|---|
| JP | 2008-123036 | | 5/2008 |
| JP | 2010-183294 A | | 8/2010 |
| WO | 2009/001510 A1 | | 12/2008 |
| WO | 2014/033885 A1 | | 3/2014 |
| WO | 2014/033936 A1 | | 3/2014 |
| WO | 2014/045344 A1 | | 3/2014 |

OTHER PUBLICATIONS

U.S. Office Action dated Nov. 2, 2017 for co-pending U.S. Appl. No. 14/672,565, 36 pages. *Please note US-2003-0202694-A1, US-2010-0054542-A1 and US-2011-0311156-A1 cited herewith, were previously cited in an IDS filed on May 8, 2017.*

Japanese Office Action dated Sep. 12, 2017 for corresponding Japanese Patent Application No. 2014-086682, with English Translation, 7 pages.

Japanese Office Action dated Sep. 12, 2017 for corresponding Japanese Patent Application No. 2014-086771, with English Translation, 6 pages.

U.S. Office Action dated Sep. 15, 2017 for co-pending U.S. Appl. No. 14/662,777, 32 pages. *Please note US-2010/0080467 cited herewith, was previously cited in an IDS filed on Mar. 30, 2015.*

U.S. Notice of Allowance dated Jun. 15, 2018 for copending U.S. Appl. No. 14/672,565, 8 pages.

U.S. Notice of Allowance dated Apr. 12, 2018 for copending U.S. Appl. No. 14/662,777, 25 pages.

U.S. Notice of Allowance dated Mar. 30, 2018 for copending U.S. Appl. No. 14/672,565, 29 pages.

* cited by examiner

| FRAME NUMBER | STRAIGHT LINE IDENTIFICA-TION NUMBER | STARTING POINT COORDINATES | END POINT COORDINATES |
|---|---|---|---|
| ... | | | |
| N | 101 | (a1, b1) | (c1, d1) |
| | 102 | (a2, b2) | (c2, d2) |
| | 103 | (a3, b3) | (c3, d3) |
| ... | | | |
| N+10 | 501 | (a4, b4) | (c4, d4) |
| | 502 | (a5, b5) | (c5, d5) |
| | 503 | (a6, b6) | (c6, d6) |
| ... | | | |

| FRAME NUMBER | STRAIGHT LINE IDENTIFICATION NUMBER | ANGLE |
|---|---|---|
| ... | | |
| N | 101 | A1 |
| | 102 | A2 |
| | 103 | A3 |
| ... | | |
| N+10 | 501 | A4 |
| | 503 | A5 |
| ... | | |

FIG.9

METHOD OF DETECTING TILT OF IMAGE CAPTURING DIRECTION AND APPARATUS OF DETECTING TILT OF IMAGE CAPTURING DIRECTION

CROSS-REFERENCE TO RELATED APPLICATION(S)

This application is based upon and claims the benefit of priority of the prior Japanese Patent Application No. 2014-086526, filed on Apr. 18, 2014, the entire contents of which are incorporated herein by reference.

FIELD

The embodiment discussed herein is related to a method of detecting a tilt of an image capturing direction and an apparatus of detecting tilt of an image capturing direction.

BACKGROUND

An accident can be prevented from occurring if information on locations where near miss cases, i.e., incidents making a driver feel one's blood freeze or alarmed such as almost hitting a pedestrian while driving, are more likely to take place can be given to the driver. In view of this, there exist conventional techniques for detecting near miss cases by analyzing image data recorded in a drive recorder. These related-art examples are described, for example, in Japanese Laid-open Patent Publication No. 08-285534, Japanese Laid-open Patent Publication No. 2004-239613, and Japanese Laid-open Patent Publication No. 2008-123036.

SUMMARY

According to an aspect of an embodiment, a method, executed by a computer, including: acquiring a captured image from an image capturing device carried in a vehicle; extracting a plurality of lines from the acquired captured image; and detecting a tilt of an image capturing direction of the image capturing device in accordance with a magnitude of an angle between a vertical axis direction or a horizontal axis direction of the captured image and the extracted plurality of lines.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENT(S)

The conventional techniques for detecting near miss cases presuppose that image data to be analyzed is image data captured by an image capturing device properly installed in a vehicle. Therefore, if an image capturing direction of an image capturing device is tilted, for example, a valid analysis result may not be obtained when analysis is made on the image data captured by such an image capturing device.

Preferred embodiments of the present invention will be explained with reference to accompanying drawings. Note that the present invention is not limited by these embodiments.

Figure 1:
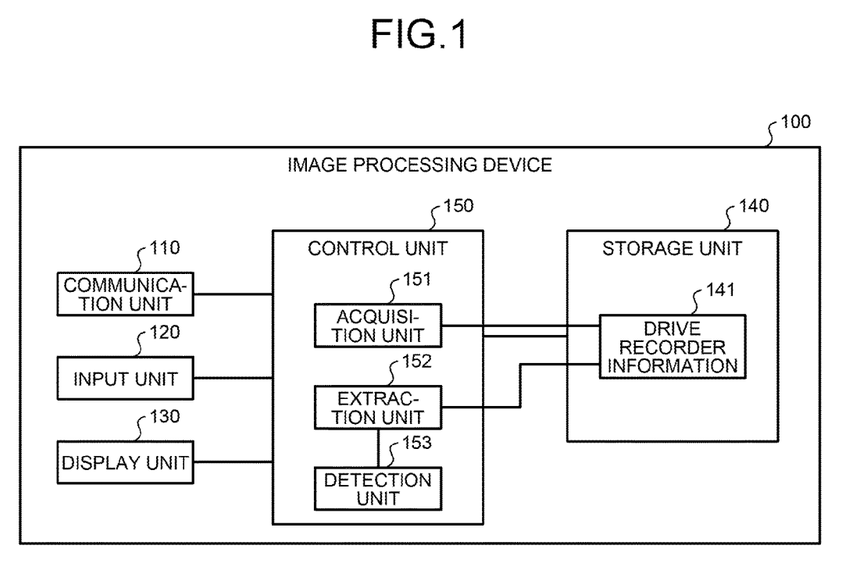
FIG. 1 is a functional block diagram of an image processing device according to one embodiment.

FIG. 1 is a functional block diagram of an image processing device according to the present embodiment. An image processing device 100 is an example of the device for detecting a tilt of an image capturing direction. As illustrated in FIG. 1, the image processing device 100 includes: a communication unit 110; an input unit 120; a display unit 130; a storage unit 140; and a control unit 150.

The communication unit 110 is a processing unit for performing data communication with other devices via a network. For example, the communication unit 110 corresponds to a communication device or the like.

The input unit 120 is an input device for inputting various data to the image processing device 100. For example, the input unit 120 corresponds to a keyboard, a mouse, a touch panel, or the like. The display unit 130 is a display device for displaying data outputted from the control unit 150. For example, the display unit 130 corresponds to a liquid crystal display, a touch panel, or the like.

The storage unit 140 is a storage unit for storing drive recorder information 141. For example, the storage unit 140 corresponds to a storage device such as a semiconductor memory element examples of which may include a RAM (Random Access Memory), a ROM (Read Only Memory), and a flash memory.

Figure 2:
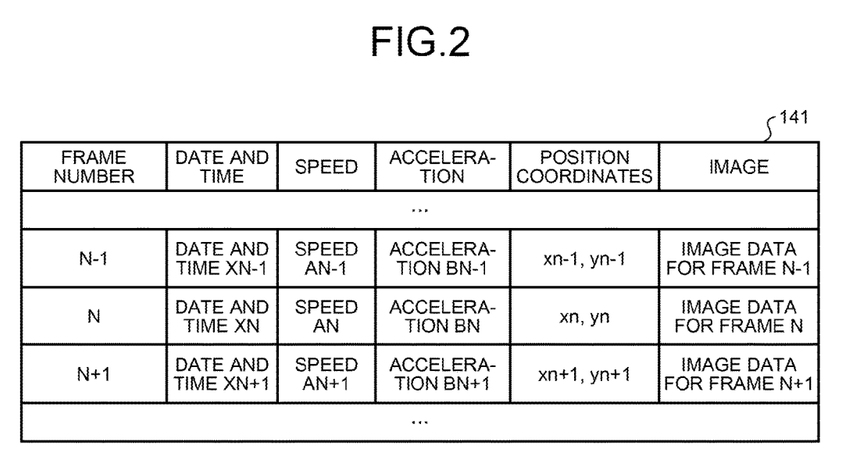
FIG. 2 is a chart illustrating one example of a data structure of drive recorder information.

The drive recorder information 141 contains various data recorded by a drive recorder. FIG. 2 is a chart illustrating one example of a data structure of the drive recorder information. As illustrated in FIG. 2, the drive recorder information 141 retains a frame number, date and time, a speed, an acceleration, position coordinates, and an image in association with one another.

The frame number refers to a number for uniquely identifying a frame. The date and time refer to date and time when the corresponding frame is captured. The speed refers to a speed of a vehicle carrying the drive recorder at the point when the corresponding frame is captured. The acceleration refers to an acceleration of the vehicle carrying the drive recorder at the point when the corresponding frame is captured. The position coordinates refer to position coordinates of the vehicle carrying the drive recorder at the point when the corresponding frame is captured. The image refers to image data of the corresponding frame.

The control unit 150 includes: an acquisition unit 151; an extraction unit 152; and a detection unit 153. The control unit 150 corresponds to an integrated device such as an ASIC (Application Specific Integrated Circuit) or an FPGA (Field Programmable Gate Array), for example. Alternatively, the control unit 150 corresponds to an electronic circuit such as a CPU (Central Processing Unit) or an MPU (Micro Processing Unit), for example.

The acquisition unit 151 is a processing unit for acquiring drive recorder information from a drive recorder or the like. The acquisition unit 151 registers the drive recorder information acquired from the drive recorder or the like in the storage unit 140 as the drive recorder information 141. Note that the acquisition unit 151 may successively acquire image data from an image capturing device such as a camera and successively register the acquired image data in the drive recorder information 141.

The extraction unit 152 is a processing unit for extracting a plurality of straight lines from the image data on the basis of the drive recorder information 141. The extraction unit 152 outputs information on the plurality of straight lines extracted from the image data to the detection unit 153.

The extraction unit 152 performs processing of acquiring image data captured by a camera while a vehicle is traveling straight and processing of extracting straight lines.

An example of the processing in which the extraction unit 152 acquires image data captured by a camera while a vehicle is traveling straight will be described. The extraction unit 152 accesses the drive recorder information 141, specifies the image data of a frame having a speed equal to or greater than a first threshold value and an acceleration smaller than a second threshold value, and acquires the specified image data. The image data for the frame specified by the extraction unit 152 is used as the image data captured by the camera while straight traveling.

Figure 3:
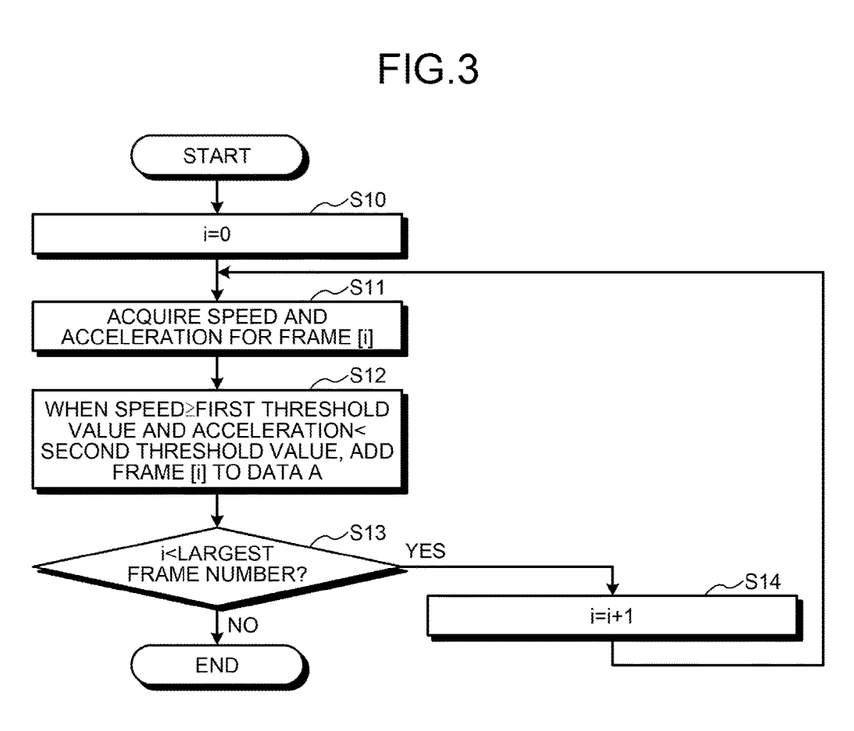
FIG. 3 is a flow chart illustrating processing of acquiring image data captured by a camera while straight traveling.

FIG. 3 is a flow chart illustrating the processing of acquiring image data captured by a camera while straight traveling. As illustrated in FIG. 3, the extraction unit 152 sets a value of i to 0 (step S10). The extraction unit 152 acquires the speed and acceleration for the frame number [i] (step S11).

When the speed ≥the first threshold value and the acceleration <the second threshold value, the extraction unit 152 adds the image data for the frame number [i] to data A (step S12). The extraction unit 152 determines whether or not i<the largest frame number (step S13). When i<the largest frame number is not true (step S13, No), the extraction unit 152 ends the processing of acquiring image data captured by a camera while straight traveling.

When i<the largest frame number is true (step S13, Yes), in contrast, the extraction unit 152 updates the value of i by the value of i+1 (step S14) and proceeds to the step S11.

Subsequently, the extraction unit 152 performs the processing of extracting straight lines. The extraction unit 152 attempts to extract straight lines from each of the image data for the respective frame numbers stored in the data A by the processing explained in FIG. 3.

The extraction unit 152 generates edge image data with a highlighted edge component by performing Canny filter on the image data. The extraction unit 152 then performs Hough transform on the edge image data to extract straight lines from the edge image data.

Note that the extraction unit 152 performs the Hough transform on a central portion of the edge image data to extract straight lines. Since a peripheral portion of the edge image data left by excluding the central portion has large image distortion, the extraction unit 152 is inhibited from extracting straight lines from such a peripheral portion.

Figure 4:
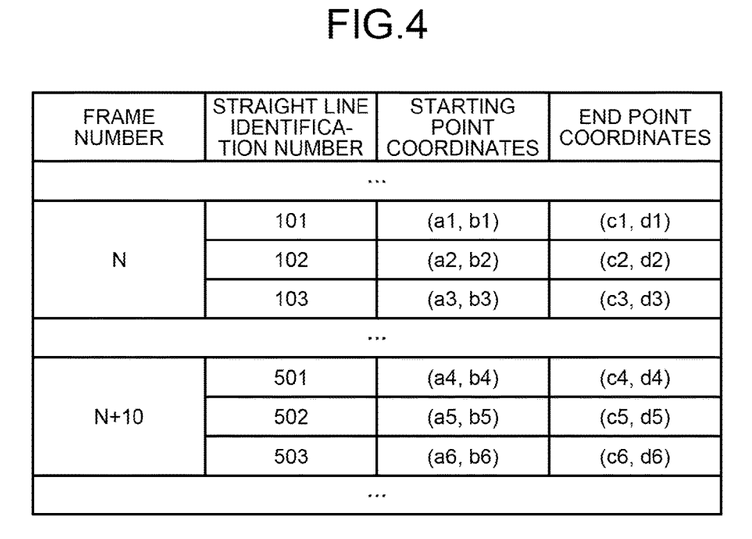
FIG. 4 is a chart illustrating one example of a data structure of information on straight lines.

The extraction unit 152 generates information on straight lines by repeatedly performing the above-described processing on each of the image data for the respective frame numbers stored in the data A. FIG. 4 is a chart illustrating one example of a data structure of the information on straight lines. As illustrated in FIG. 4, the information on straight lines associates a frame number, a straight line identification number, starting point coordinates, and end point coordinates with one another. The frame number refers to a number for uniquely identifying a frame. The straight line identification number refers to a number for uniquely identifying a straight line. The starting point coordinates refer to starting point coordinates of a straight line on image data. The end point coordinates refer to end point coordinates of the straight line on the image data.

Figure 5:
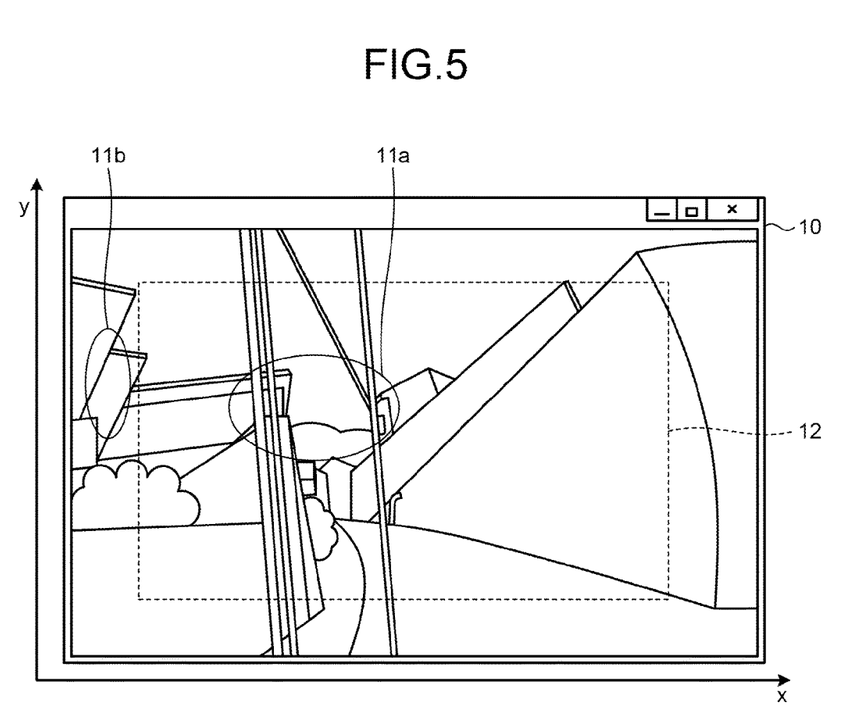
FIG. 5 is a diagram for supplementarily explaining processing of an extraction unit.

FIG. 5 is a diagram for supplementarily explaining the processing of the extraction unit. For example, the vertical axis of image data is referred to as a y-axis and the horizontal axis thereof is referred to as an x-axis. The extraction unit 152 performs the Canny filter on image data 10 and then performs the Hough transform thereon to extract a plurality of straight lines 11a. Note that the extraction unit 152 extracts straight lines included in a central portion 12. For example, straight lines 11b are excluded from an extraction target since they are straight lines not included in the central portion 12. Although straight lines other than the straight lines 11a and 11b are also extracted in practice, the illustration thereof is omitted here.

The detection unit 153 is a processing unit for detecting whether or not a tilt of an image capturing direction of a camera is an abnormal tilt. The detection unit 153 specifies a straight line contained in the information on straight lines acquired from the extraction unit 152 having an angle between the straight line and a vertical straight line falling within the range from $-M°$ to $+M°$. For example, the vertical straight line is a straight line parallel to the y-axis of the image data. Although a value of M is set to $\pi/16$, for example, a user may appropriately change the value of M.

Figure 6:
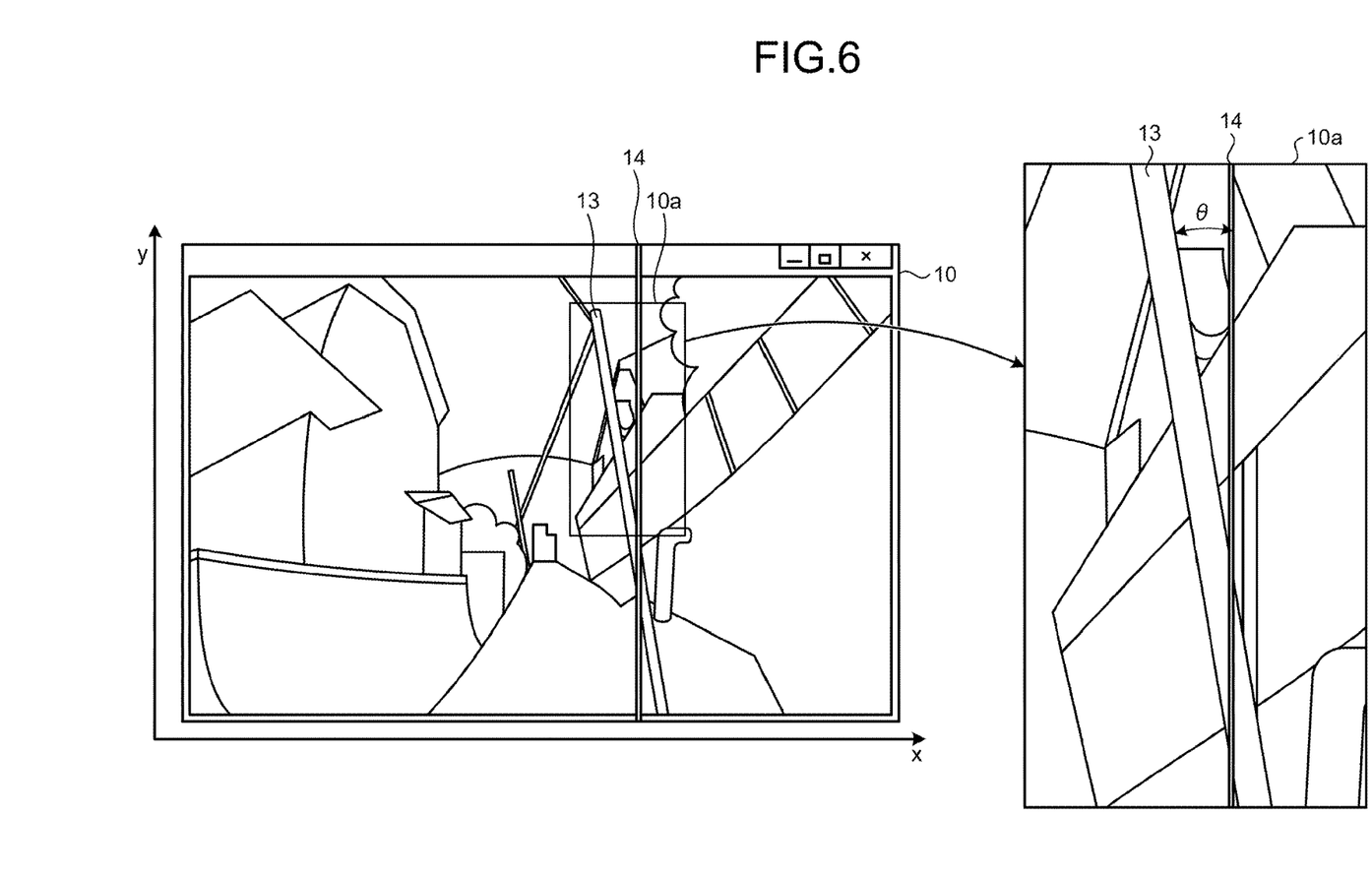
FIG. 6 is a diagram for supplementarily explaining the processing of the extraction unit.

FIG. 6 is a diagram for supplementarily explaining the processing of the extraction unit. In FIG. 6, the vertical axis of the image data 10 is referred to as the y-axis and the horizontal axis thereof is referred to as the x-axis. The extraction unit 152 specifies a straight line 13 if an angle $\theta$ between the straight line 13 and a vertical straight line 14 falls within the range from $-M°$ to $+M°$. For the purpose of illustration, only the straight line 13 is illustrated here.

The detection unit 153 stores information on the specified straight line in a straight line table. The detection unit 153 repeatedly performs the above-described processing on each of the straight lines contained in the information on straight lines and registers information on straight lines each having an angle made with the vertical straight line 14 falling within the range from $-M°$ to $+M°$ in the straight line table. For example, the detection unit 153 extracts straight lines for each of the image data for the respective frame numbers.

Figure 7:
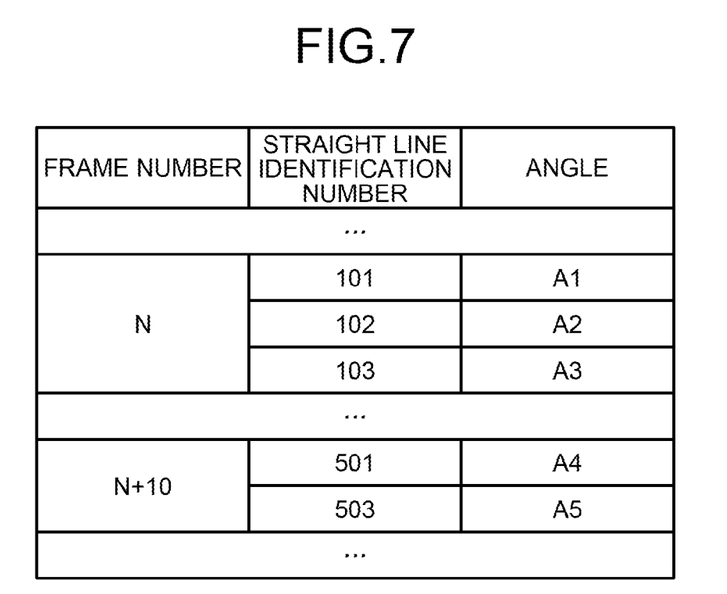
FIG. 7 is a chart illustrating one example of a data structure in a straight line table.

FIG. 7 is a chart illustrating one example of a data structure in the straight line table. As illustrated in FIG. 7, the straight line table includes a frame number, a straight line identification number, and an angle. Explanation on the frame number and the straight line identification number is the same as that of FIG. 4. The angle refers to an angle between the straight line corresponding to the straight line identification number and the vertical straight line.

After the information on the straight lines is registered in the straight line table, the detection unit 153 counts the number of straight lines for the same frame number and determines whether or not the counted number of straight lines is equal to or greater than a third threshold value. If the counted number of straight lines is smaller than the third threshold value, the detection unit 153 determines that the tilt of the image capturing direction of the camera is not an abnormal tilt.

If the counted number of straight lines is equal to or greater than the third threshold value, in contrast, the detection unit 153 calculates an average angle α of the angles between the straight lines and the vertical straight line for the same frame number. For example, if the condition of Expression (1) is satisfied, the detection unit 153 determines that the tilt of the image capturing direction of the camera is an abnormal tilt. If the condition of Expression (1) is not satisfied, in contrast, the detection unit 153 determines that the tilt of the image capturing direction of the camera is a normal tilt. The detection unit 153 determines that the tilt of the image capturing direction of the camera is an abnormal tilt when the absolute value of a value obtained by subtracting π/2 from the average angle α is greater than a fourth threshold value.

$$\text{abs}(\alpha - \pi/2) > \text{the fourth threshold value} \qquad (1)$$

Figure 8:
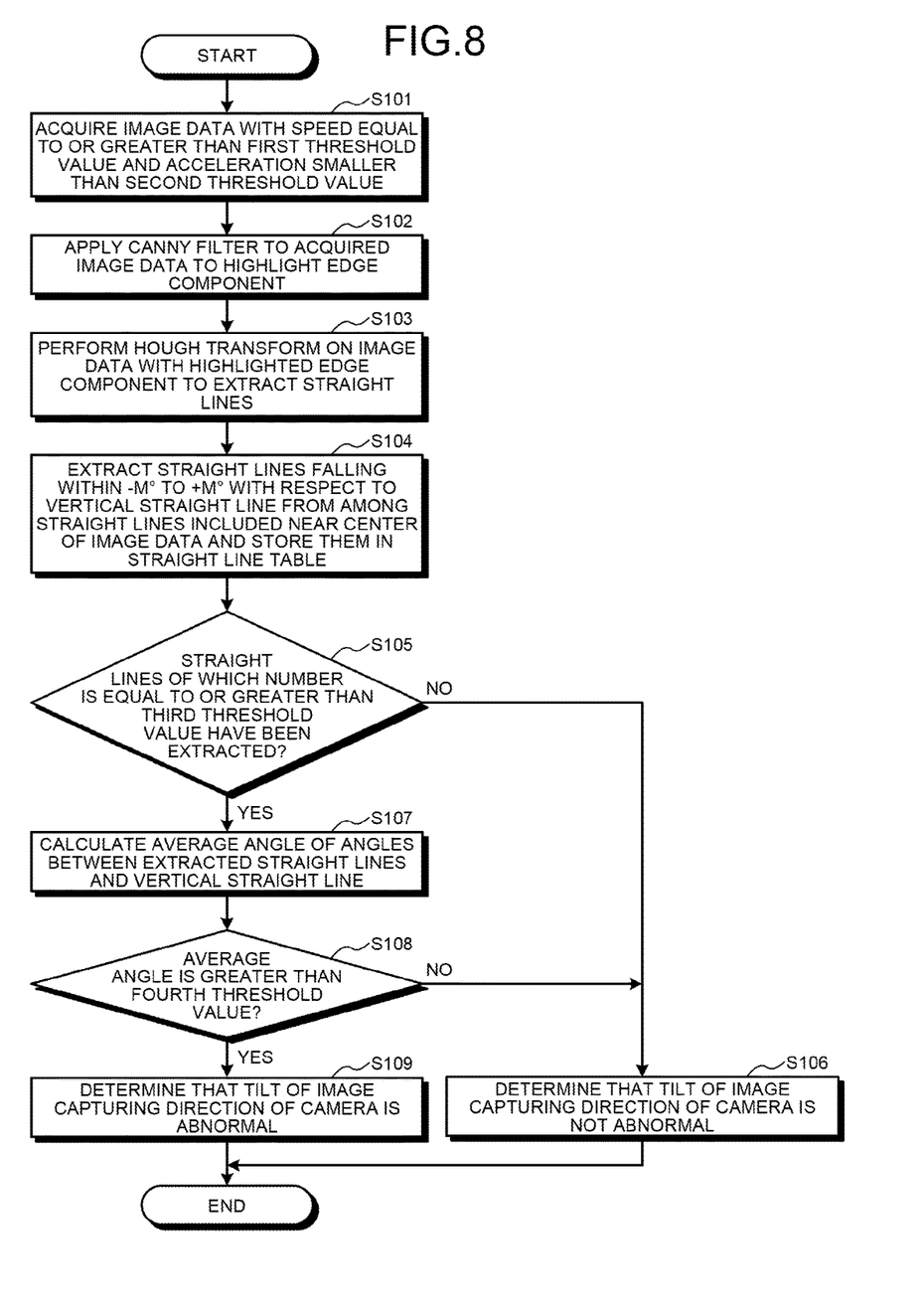
FIG. 8 is a flow chart illustrating a procedure of the image processing device according to the present embodiment.

A procedure of the image processing device 100 according to the present embodiment will be described next. FIG. 8 is a flow chart illustrating the procedure of the image processing device according to the present embodiment. As illustrated in FIG. 8, the image processing device 100 acquires image data having a speed equal to or greater than the first threshold value and an acceleration smaller than the second threshold value (step S101).

The extraction unit 152 of the image processing device 100 applies the Canny filter to the acquired image data to highlight the edge component thereof (step S102). The extraction unit 152 performs the Hough transform on the image data with the highlighted edge component to extract straight lines (step S103).

The extraction unit 152 extracts straight lines falling within the range from −M° to +M° with respect to the vertical straight line from among the straight lines included in the vicinity of the center of the image data and stores those straight lines in the straight line table (step S104). The detection unit 153 determines whether or not straight lines of which the counted number is equal to or greater than the third threshold value have been extracted on the basis of the straight line table (step S105). If straight lines of which the counted number is equal to or greater than the third threshold value have not been extracted (step S105, No), the detection unit 153 determines that the tilt of the image capturing direction of the camera is not abnormal (step S106).

If straight lines of which the counted number is equal to or greater than the third threshold value have been extracted (step S105, Yes), in contrast, the detection unit 153 calculates the average angle of angles between the extracted straight lines and the vertical straight line (step S107). The detection unit 153 determines whether or not the average angle is greater than the fourth threshold value (step S108). If the average angle is not greater than the fourth threshold value (step S108, No), the detection unit 153 proceeds to the step S106.

If the average angle is greater than the fourth threshold value (step S108, Yes), in contrast, the detection unit 153 determines that the tilt of the image capturing direction of the camera is abnormal (step S109).

An effect of the image processing device 100 according to the present embodiment will be described next. The image processing device 100 extracts a plurality of lines from image data and detects a tilt of an image capturing direction of a camera according to the magnitudes of angles between the vertical axis direction of the image data and the extracted plurality of lines. Thus, according to the image processing device 100, the tilt of the image capturing direction of the camera can be detected on the basis of the image data.

The image processing device 100 detects a tilt of an image capturing direction of an image capturing device according to the number of lines each having an angle made with the vertical axis direction of image data exceeding a predetermined magnitude. Thus, according to the image processing device 100, whether or not a tilt of an image capturing direction of a camera is abnormal can be accurately determined while excluding influences such as noise which may be generated in image data.

The image processing device 100 detects a tilt of an image capturing direction of a camera on the basis of lines extracted from a region excluding edge portions on either side of image data. Thus, whether or not a tilt of an image capturing direction of a camera is abnormal can be accurately determined while excluding the influence of distortion contained in the ends of image data.

Although, in the present embodiment, a tilt of an image capturing direction of a camera is detected according to the magnitudes of angles between the vertical axis direction of image data and plurality of extracted lines as an example, the present invention is not limited thereto. For example, the image processing device 100 may detect a tilt of an image capturing direction of a camera according to the magnitudes of angles between the horizontal axis direction of image data and a plurality of lines.

Alternative processing made by the detection unit 153 will now be described. For example, the detection unit 153 of the image processing device 100 specifies a straight line contained in the information on straight lines acquired from the extraction unit 152 having an angle between the straight line and a horizontal straight line falling within the range of −M° to +M°. For example, the horizontal straight line is a straight line parallel to the x-axis of image data. In this case, the detection unit 153 registers information on straight lines each having an angle made with the horizontal straight line falling within the range of −M° to +M° in the straight line table.

After the information on the straight lines is registered in the straight line table, the detection unit 153 counts the number of straight lines for the same frame number and determines whether or not the counted number of straight lines is equal to or greater than the third threshold value. If the counted number of straight lines is smaller than the third threshold value, the detection unit 153 determines that the tilt of the image capturing direction of the camera is not an abnormal tilt.

If the counted number of straight lines is equal to or greater than the third threshold value, in contrast, the detection unit 153 calculates an average angle α of the angles between the straight lines and the horizontal straight line for the same frame number. For example, if the condition of Expression (2) is satisfied, the detection unit 153 determines that the tilt of the image capturing direction of the camera is an abnormal tilt. If the condition of Expression (2) is not satisfied, in contrast, the detection unit 153 determines that the tilt of the image capturing direction of the camera is a normal tilt.

$$\text{abs}(\alpha) > \text{the fourth threshold value} \qquad (2)$$

Figure 9:
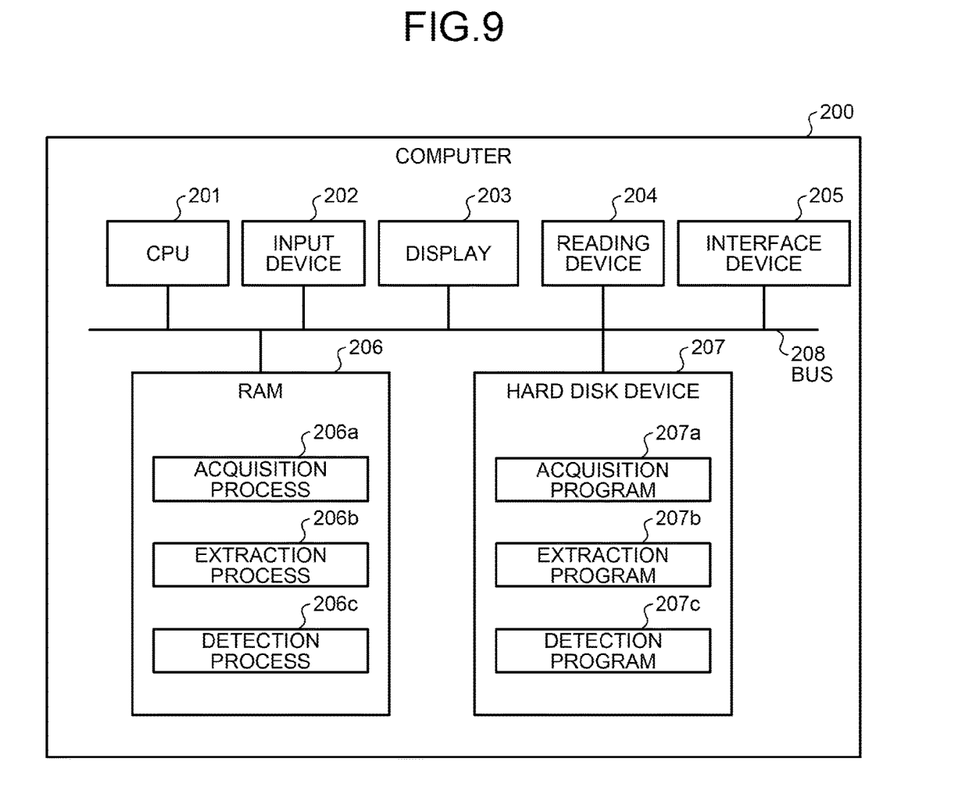
FIG. 9 is a diagram illustrating one example of a computer which executes a program for detecting a tilt of an image capturing direction.

An example of a computer which executes a program for evaluating an attached state of an image capturing device fulfilling a function similar to that of the image processing device 100 illustrated in the above-described embodiment will be described next. FIG. 9 is a diagram illustrating one example of a computer which executes a program for detecting a tilt of an image capturing direction.

As illustrated in FIG. 9, a computer 200 includes: a CPU 201 for executing various arithmetic processing; an input device 202 for receiving a data input from a user; and a display 203. The computer 200 further includes: a reading device 204 for reading out a program or the like from a storage medium; and an interface device 205 for providing and receiving data to and from other computers via a network. The computer 200 further includes: a RAM 206 for temporarily storing various information; and a hard disk device 207. These devices 201 to 207 are connected to a bus 208.

The hard disk device 207 includes: an acquisition program 207a; an extraction program 207b; and a detection program 207c. The CPU 201 reads out the acquisition program 207a, the extraction program 207b, and the detection program 207c and runs them in the RAM 206. The acquisition program 207a functions as an acquisition process 206a. The extraction program 207b functions as an extraction process 206b. The detection program 207c functions as a detection process 206c.

For example, the acquisition process 206a corresponds to the acquisition unit 151. The extraction process 206b corresponds to the extraction unit 152. The detection process 206c corresponds to the detection unit 153.

For example, the acquisition program 207a, the extraction program 207b, and the detection program 207c may be stored in a "portable physical medium" such as a flexible disk (FD), a CD-ROM, a DVD disk, a magneto-optical disk, or an IC card to be inserted into the computer 200. Then, the computer 200 may read out and execute the acquisition program 207a, the extraction program 207b, and the detection program 207c.

According to one embodiment of the present invention, a tilt of an image capturing direction can be detected on the basis of image data acquired by an image capturing device.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A method, executed by a computer, comprising:
   extracting a plurality of lines from each of a plurality of traveling-straight images that are acquired in advance from captured images that are acquired from an image capturing device carried in a vehicle and are stored in a storage unit along with speed data and acceleration data of the vehicle for each of the captured images, the speed data for the traveling-straight images exceeding a predetermined speed and the acceleration data for the traveling-straight images being less than a predetermined acceleration, indicating that the vehicle was traveling, while the traveling-straight images were captured, in a straight line among lines in which the vehicle was traveling, by performing a filter respectively on the traveling-straight images to generate an edge image data and then by performing a Hough transform on a central portion of the generated edge image data; and
   determining an abnormal tilt of an image capturing direction of the image capturing device, based on a number of the extracted plurality of lines and a tilt of an axis that is the image capturing direction of the image capturing device, the tilt being detected from a magnitude of an angle that is an average of calculated angles between a vertical axis direction or a horizontal axis direction of a traveling-straight image and each of the extracted plurality of lines.

2. A non-transitory computer-readable recording medium storing a program that causes a computer to execute a process comprising:
   extracting a plurality of lines from each of a plurality of traveling-straight images that are acquired in advance from captured images that are acquired from an image capturing device carried in a vehicle and are stored in a storage unit along with speed data and acceleration data of the vehicle for each of the captured images, the speed data for the traveling-straight images exceeding a predetermined speed and the acceleration data for the traveling-straight images being less than a predetermined acceleration, indicating that the vehicle was traveling, while the traveling-straight images were captured, in a straight line among lines in which the vehicle was traveling, by performing a filter respectively on the traveling-straight images to generate an edge image data and then by performing a Hough transform on a central portion of the generated edge image data; and
   determining an abnormal tilt of an image capturing direction of the image capturing device, based on a number of the extracted plurality of lines and a tilt of an axis that is the image capturing direction of the image capturing device, the tilt being detected from a magnitude of an angle that is an average of calculated angles between a vertical axis direction or a horizontal axis direction of a traveling-straight image and each of the extracted plurality of lines.

3. An apparatus comprising
   a processor configured to:
   extract a plurality of lines from each of a plurality of traveling-straight images that are acquired in advance from captured images that are acquired from an image capturing device carried in a vehicle and are stored in a storage unit along with speed data and acceleration data of the vehicle for each of the captured images, the speed data for the traveling-straight images exceeding a predetermined speed and the acceleration data for the traveling-straight images being less than a predetermined acceleration, indicating that the vehicle was traveling, while the traveling-straight images were captured, in a straight line among lines in which the vehicle was traveling, by performing a filter respectively on the traveling-straight images to generate an edge image data and then by performing a Hough transform on a central portion of the generated edge image data; and
   determine an abnormal tilt of an image capturing direction of the image capturing device, based on a number of the extracted plurality of lines and a tilt of an axis that is the image capturing direction of the image capturing device, the tilt being detected from a magnitude of an angle that is an average of calculated angles between a vertical axis direction or a horizontal axis direction of a traveling-straight image and each of the extracted plurality of lines.

* * * * *